United States Patent [19]
Strunk

[11] 3,922,746
[45] Dec. 2, 1975

[54] BLEEDER VALVE CLEANER

[76] Inventor: Fred E. Strunk, 205 Landana St., Vallejo, Calif. 94590

[22] Filed: May 8, 1974

[21] Appl. No.: 467,954

[52] U.S. Cl. .......................... 15/104.1 R; 15/104.16
[51] Int. Cl.² ........................................... B08B 9/02
[58] Field of Search..... 15/104.1 R, 104.11, 104.16, 15/104.3 R, 104.3 SN, 104.2; 4/255

[56] References Cited
UNITED STATES PATENTS

| | | | |
|---|---|---|---|
| 2,039,467 | 5/1936 | Walsh | 15/104.3 SN X |
| 2,454,884 | 11/1948 | Peaden | 4/255 |
| 2,514,339 | 7/1950 | Robinson et al. | 15/104.3 SN X |
| 2,610,696 | 9/1952 | Mayberry | 15/104.1 R X |

*Primary Examiner*—Edward L. Roberts
*Attorney, Agent, or Firm*—Warren, Chickering & Grunewald

[57] ABSTRACT

There is disclosed a cleaner for a bleeder valve of the gate or cock type which includes a rotatable shaft passing through a packing gland to the interior of a casing which contains a flexible shaft connected at one end to the rotatable shaft and at the other end to a drill. The casing is sealed to the packing gland and adapted for fluid-tight connection to the valve to be cleaned, and a valve is provided to vent the interior of the casing.

3 Claims, 1 Drawing Figure

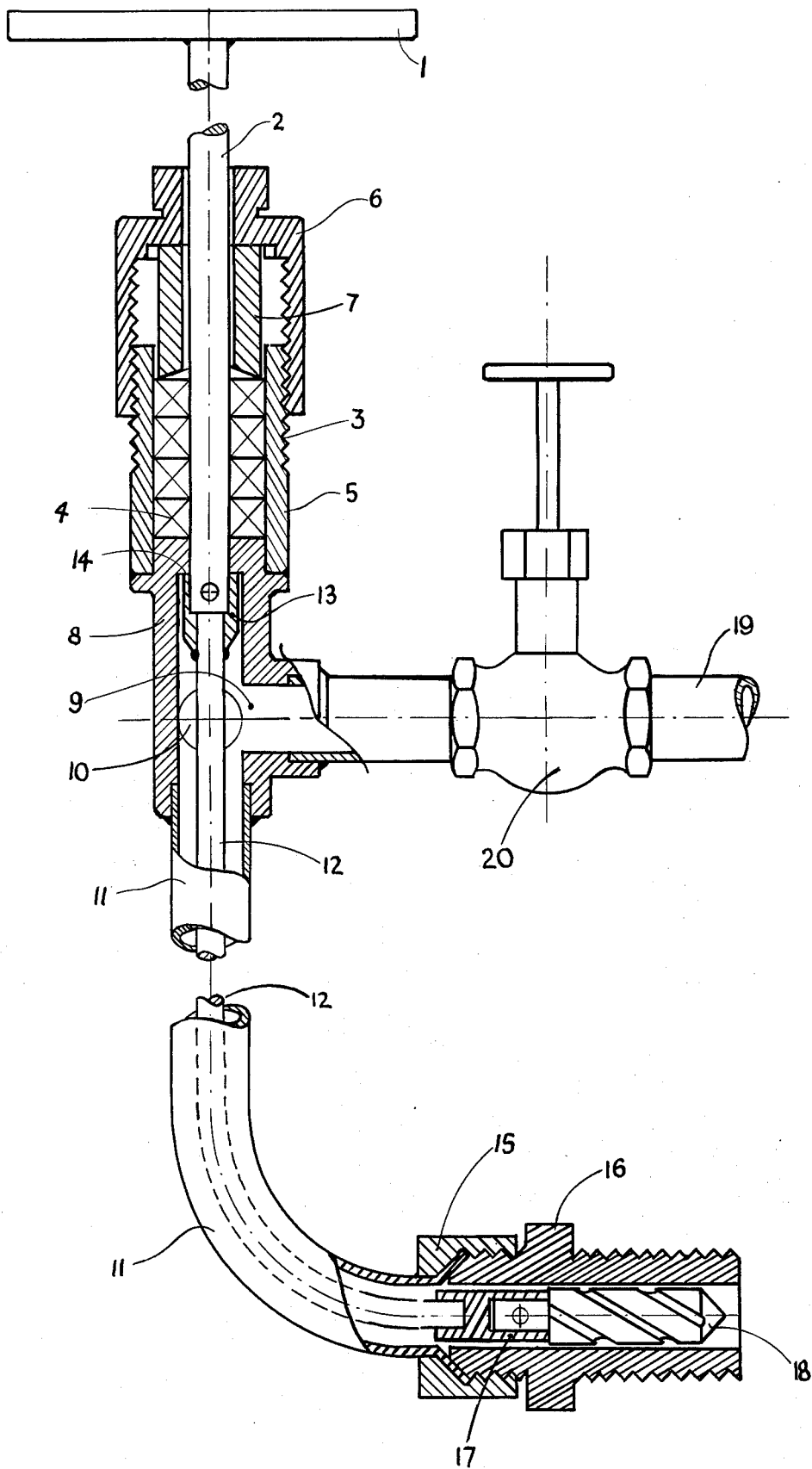

BLEEDER VALVE CLEANER

BACKGROUND OF THE INVENTION

Bleeder valves are widely employed to extract small streams from large flowing streams or large vessels holding fluid. Examples of uses for bleeder valves are the removal of sediment from the bottom of a reservoir, the removal of water from the bottom of a gasoline storage tank or the removal of samples of fluid being processed and passing through a large diameter process line. Bleeder valves are usually very small compared with the pipe or vessel they are associated with, and they frequently become clogged. For example, bleeder valves removing material from the bottom of a storage tank will become clogged with sediment, and bleeder valves in process lines may become clogged with coke, scale or solid reaction products. When a bleeder valve becomes clogged, either the entire tank must be emptied or the process shut down to clean the bleeder valve, or the operation must be carried out without the use of bleeder valves to remove impurities or to obtain samples.

In the past, bleeder valves have been cleaned rather than shutting down a process or emptying a storage vessel. Bleeder valves desirably are of the gate valve or cock type so that cleaning can be effected without removing and replacing the valve. A valve of the gate or cock type can be rodded, usually with very small loss of fluid. However, when the fluid is under high pressure or when it is extremely hot or flammable or corrosive, even a small, temporary "leak" cannot be tolerated. In addition, rodding a valve will cause the offensive material that clogged it to enter the storage vessel or process line. Arranging for a small leak through the valve cleaner to carry these materials from the process line has been accomplished, for example, as disclosed in U.S. Pat. No. 2,940,098; however, the use of the apparatus disclosed in that patent is naturally limited to relatively low pressure systems carrying innocuous fluids such as water mains.

Bleeder valves are frequently in inaccessible locations. For example, bleeder valves to remove sediments or heavier liquids from a vessel must be located in the lowest portion of the vessel. Known devices for cleaning bleeder valves, such as the device disclosed in the aforementioned U.S. Pat. No. 2,940,098, require a good deal of clearance and accordingly are difficult to install and are difficult to use in cleaning bleeder valves in inaccessible locations.

THE INVENTION

The present invention is a cleaner for a bleeder valve of the gate or cock type which includes an operating handle connected to a shaft that passes through a packing gland into the interior of an elongated casing that is connected in fluid-tight relationship to the packing gland. The shaft is long enough to be moved into and out of the packing gland a distance suitable for driving a cleaning element into and out of a clogged bleeder valve, and it is contacted by the packing to maintain a fluid-tight seal during rotation or longitudinal motion. Within the casing, the shaft is connected to a flexible shaft in such manner that when the shaft is moved longitudinally within the casing, the flexible shaft moves longitudinally also; and when the shaft is rotated, the flexible shaft rotates correspondingly. The casing is connected in fluid-tight relationship with the packing gland at one end, and is adapted at the other end to be temporarily connected in fluid-tight relationship with the bleeder valve. The flexible shaft is connected to a drill or other suitable means for cleaning a bleeder valve in such manner that rotation of the flexible shaft will cause corresponding rotation of the drill. The device also includes a valve to vent the interior of the casing. This valve preferably is located in a housing for the packing gland, and it may be employed to discharge fluid from the casing or to bleed fluid from the casing to insure that scale or sediment removed from the bleeder valve being cleaned will be carried away from the vessel or process line rather than carried into it.

DETAILED DESCRIPTION OF THE INVENTION

The invention can be better described with reference to the accompanying drawing which illustrates in partial sectional view a device embodying this invention.

In the drawing an operating handle 1 is connected to a long solid shaft 2 that passes through a packing gland generally designated 3. The packing gland is of the conventional type including packing 4 that is selected to be suitable for the service to be encountered, a housing 5 to contain the packing snugly, a packing nut 6 adapted to engage a threaded connection on the housing 5 and to fit snugly around the shaft 2, and a packing compressing element 7 that fits into housing 5 and compresses the packing 4 when the packing nut 6 is tightened. At the other end of the packing gland housing 5 is a closure element 8 for restraining the packing when the compression element 7 compresses it. The closure element 8 is also adapted with a threaded hole 9 to receive a suitable valve assembly. The closure assembly 8 may also include openings such as 10 to receive condition sensing instruments such as pressure gauges, thermometers or other useful elements when the use of such elements is convenient.

A casing 11 is welded into the closure 8 in fluid-tight relationship. The casing is a tubing that is selected of a material and with wall thicknesses adapted to withstand the temperature, pressure and character of whatever materials will enter it during a bleeder valve cleaning operation. In general, the device of this invention is not in continuous operation and may readily be cleaned with water, soap, solvents or the like so that it is not necessary to make it of material that will withstand corrosion for a prolonged period of time. However, the materials of construction must withstand the temperatures and pressures that are encountered in cleaning a bleeder valve.

The end of the shaft 2 that extends into casing 11 is connected to a flexible shaft 12 within the casing. The flexible shaft 12 is one known to the art that is capable of passing aroung smooth, large radius bends in pipes but still being of sufficient stiffness so that rotating one end of the flexible shaft will cause the other end to rotate. Stiff cables that are rotated in the direction that they are wound are suitable for this purpose. An interior collar 13 preferably is employed as a coupling to connect the end of shaft 2 with the end of flexible shaft 12. The interior collar may be welded to both elements or connected with pins, but it is preferably used to prevent high pressures from blowing the shaft 2 out through the back of the gland 3 by engaging a shoulder 14 which is machined onto the restraining element 8.

The other end of casing 11 is adapted to make a fluid-tight seal with the bleeder valve to be cleaned. This may be accomplished by employing a conventional flared joint 15 as illustrated in the drawing or by other means known to the art for engaging the threads of a valve with an adaptor to connect it in fluid-tight relationship with a piece of tubing. The flexible shaft 12 is connected by conventional means, such as coupling 17, to a drill 18. The drill 18 is manufactured so that rotation in one direction will cause it to drill and advance through accumulated solids, and when the flexible shaft 12 is a wound cable, the drill should be both advanced and retracted from the bleeder valve while rotating the handle 1 in the same direction.

The length of the flexible shaft 12 should be such that the drill is partially within the casing 11 when the shaft 2 is fully retracted. The length of shaft 2 should be such that when it is advanced into the casing 11, it will be long enough to force the drill 18 far enough into the bleeder valve and any pipes that are attached to it to dislodge any solids, crusts or sediments that are interfering with the free-flow of fluid through the bleeder valve. Although casing 11 may be straight, the preferred embodiment of this invention is as illustrated wherein casing 11 effects a 90° bend closely adjacent to that end of the casing that is connected to a bleeder valve. With this construction, the device of this invention may be connected to a bleeder valve where only inches of clearance are available; and of equal importance, handle 1 may be operated without requiring operating personnel to maneuver into difficult positions.

In operation, when a bleeder valve of the gate valve or cock type is to be cleaned, an adapter such as 16 will be screwed into the end of the valve to be cleaned if such adapter is necessary. When the adapter is screwed into the valve, a suitable union type fitting, such as the flared joint 15 illustrated in the FIGURE, will be connected to the adapter 16 whereby a fluid-tight joint with the bleeder valve is achieved. When the fluid-tight joint is achieved, the bleeder valve may be opened and any flow through the bleeder valve will fill the casing 11 and will be prevented from escaping to the atmosphere by the closed valve 20 and by the action of packing 4. It is of course essential that the casing 11, the valve 20, and the packing 4 be selected to withstand the service that they are subjected to during cleaning of the bleeder valve. When the gate valve or cock is completely open, an open passageway is exposed into which the drill 18 may be forced. Cleaning of the bleeder valve is effected by rotating handle 1 while it is advanced into the packing gland 3. This rotation, acting through the coupling 13, the flexible shaft 12 and the coupling 17, causes the drill 18 to rotate in the same direction and at the same rate as the handle 1. As drill 18 advances into the valve to be cleaned and any piping associated with that valve, it dislodges solids and causes the passageways in the bleeder to become free of obstructions. If desired, the valve 20 can be opened slightly at this point to carry dislodged material away from the bleeder valve through the casing 11 by causing a flow of fluid from the bleeder valve into casing 11. The valve 20 can be connected through suitable piping 19 to discharge in an area where such discharge is safe or even into a suitable container. If it is not desired to carry away solids dislodged in the cleaning process, the valve 20 may be maintained closed.

When the cleaning process is completed, the handle 1 is rotated while shaft 2 is retracted or withdrawn from the packing gland 3, and such rotation and withdrawal is continued until the shaft 2 has been fully withdrawn. This can usually be felt when the coupling 13 makes contact with the shoulder 14. When the shaft 2 is completely withdrawn, the drill 18 will be completely clear of the bleeder valve after which the bleeder valve may be closed thereby sealing the vessel or process line to which it is affixed. Valve 20 can then be opened to relieve internal pressure within the casing 11 so that the flared joint 15 may be broken to disassemble the device of this invention from the bleeder valve. When disassembled, the device may be thoroughly cleaned by introducing a suitable cleaning fluid through valve 20 so that it washes through the casing 11 and discharges from the flared end around the drill 18. The device may be further cleaned by inserting the shaft 2 into casing 11 to its fullest extent thereby exposing the entire drill 18 and a substantial length of the flexible shaft 12 which may be wiped by hand.

In a specific example of a device of this invention, the casing 11 is a 9-inch long one-half inch seamless stainless steel tube having a wall thickness of 0.035 inches. The shaft 2 is 5/16 inch stainless steel rod 13 inches long; and the packing gland is made to receive ¼ by ¼ inch packing which may be teflon for temperatures up to 500° F. The coupling is constructed of ⅛ inch stainless steel pipe drilled to receive the shaft 2 and the flexible shaft 12 which is ¼ inch stainless steel cable. Both the shaft 2 and the flexible shaft 12 preferably are welded to the coupling to make a firm connection. The valve 20 in this specific embodiment is a standard stainless steel ¼ inch ball valve which is adequate for this service since it may be disassembled and cleaned after each use. The connector 16 is adapted to connect to the bleeder valve to be cleaned on one side and adapted with a flared joint or other suitable joint on the other side that will not be blown out by the pressure it is to encounter during use. The smooth curve in casing 11 has a 1½ inch radius and only 4 inches of clearance is required to connect the bleeder valve cleaner to a bleeder valve.

What is claimed is:

1. In a cleaner suitable for cleaning a bleeder valve in a high pressure line without reducing the pressure in the line, said cleaner including a casing, coupling means mounted to one end of said casing and adapted for fluid-tight coupling of said cleaner to said valve, shaft means rotatably and reciprocally mounted in said casing and extending from proximate the coupling end of said casing to a position outwardly of the opposite end of said casing, a drill connected to said shaft means proximate the coupling end of said casing, said shaft means outwardly of said casing being adapted for engagement to effect rotation and reciprocation thereof, and a valve connected to said casing and adapted for selective venting of the interior of said casing, the improvement comprising:

said shaft means being formed with an inflexible, smooth surfaced section;

a packing gland mounted to said casing in fluid-tight relation thereto and surrounding and engaging said shaft means over a portion of said smooth surfaced section, said gland being adapted to provide a high pressure, fluid-tight seal between said smooth surfaced section and said gland while permitting reciprocation and rotation of said shaft with respect thereto;

said smooth surfaced section having an overall length at least about equal to the length of said gland plus the length that said shaft means is to be reciprocated;

said shaft means and said casing being provided with oppositely facing shoulders formed for interengagement to limit the displacement of said shaft means in said casing away from the coupling end thereof to prevent said smooth surfaced section from reciprocation to a position out of sealed engagement with said gland; and said shoulders being formed and said shaft means having a length causing said drill to be positioned substantially inside said casing upon interengagement of said shoulders.

2. A cleaner for cleaning bleeder valves in high pressure lines as defined in claim 1 wherein, said casing includes a bent portion between said gland and the coupling end;

said shaft means includes a flexible section inside said casing intermediate to said smooth surfaced section and said drill and extending through said bent protion; and said coupling means is provided by a union adapted for high pressure, fluid-tight coupling of said cleaner to said bleeder valve without rotating said casing.

3. A cleaner for cleaning bleeder valves in high pressure lines as defined in claim 2 wherein, said bent portion is provided at a position closely adjacent said union and said bent portion extends angularly through about a 90° turn.

* * * * *